(12) United States Patent
Jin et al.

(10) Patent No.: US 12,365,229 B2
(45) Date of Patent: Jul. 22, 2025

(54) VEHICLE BATTERY ASSEMBLY MOUNTING STRUCTURE

(71) Applicants: HYUNDAI MOTOR COMPANY, Seoul (KR); KIA CORPORATION, Seoul (KR)

(72) Inventors: Hyeon Su Jin, Bucheon-si (KR); Gyung Hoon Shin, Seoul (KR); Gun Woo Ko, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 331 days.

(21) Appl. No.: 17/988,365

(22) Filed: Nov. 16, 2022

(65) Prior Publication Data

US 2023/0249535 A1 Aug. 10, 2023

(30) Foreign Application Priority Data

Feb. 4, 2022 (KR) .................. 10-2022-0014972

(51) Int. Cl.
*B60K 1/04* (2019.01)
*B60L 50/64* (2019.01)

(52) U.S. Cl.
CPC ............. *B60K 1/04* (2013.01); *B60L 50/64* (2019.02); *B60K 2001/0438* (2013.01)

(58) Field of Classification Search
CPC .......... B60K 1/04; B60L 50/64; B60L 50/66; H01M 2220/20; H01M 50/20; B60S 5/06
See application file for complete search history.

(56) References Cited

U.S. PATENT DOCUMENTS

| | | | |
|---|---|---|---|
| 11,038,236 B2 * | 6/2021 | Montgomery | H01M 50/244 |
| 2009/0152034 A1 | 6/2009 | Takasaki et al. | |
| 2012/0129029 A1 | 5/2012 | Yi et al. | |
| 2018/0194212 A1 | 7/2018 | Hamilton et al. | |
| 2019/0337471 A1 | 11/2019 | Brehm | |
| 2020/0009957 A1 | 1/2020 | Grosse et al. | |
| 2020/0259142 A1 | 8/2020 | Yin et al. | |
| 2020/0321572 A1 * | 10/2020 | Bengtsson | H01M 50/264 |

FOREIGN PATENT DOCUMENTS

| KR | 20120060022 A | 6/2012 |
|---|---|---|
| KR | 20210001334 A | 1/2021 |

* cited by examiner

*Primary Examiner* — Jason D Shanske
*Assistant Examiner* — James J Triggs
(74) *Attorney, Agent, or Firm* — Lempia Summerfield Katz LLC

(57) ABSTRACT

A vehicle battery assembly mounting structure includes: a mounting bushing provided in a battery assembly to form a space, the space allowing movement in a vertical direction; a fastening bolt disposed to vertically penetrate the space formed by the mounting bushing; and a sleeve assembly. The sleeve assembly is configured to guide the fastening bolt, to elastically prevent the fastening bolt from being separated from the mounting bushing and to elastically support the fastening bolt with respect to the mounting bushing to allow the fastening bolt to move in the mounting bushing.

9 Claims, 7 Drawing Sheets

VEHICLE BATTERY ASSEMBLY MOUNTING STRUCTURE

CROSS-REFERENCE TO THE RELATED APPLICATION

This application claims priority to Korean Patent Application No. 10-2022-0014972, filed on Feb. 4, 2022, in the Korean Intellectual Property Office, the disclosure of which is incorporated herein by reference in its entirety.

BACKGROUND OF THE DISCLOSURE

1. Technical Field

The present disclosure relates to a vehicle battery assembly mounting structure.

2. Description of the Related Art

An electric vehicle and a hybrid vehicle include a high-voltage battery assembly (hereinafter simply referred to as a "battery assembly") mounted therein. The battery assembly may be mounted in the lower portion of a vehicle body.

Particularly, the electric vehicle has a demerit or disadvantage in that recharging time of the battery assembly is relatively longer than refueling time of a general internal combustion engine vehicle (ICEV). In order to solve the above-mentioned problem, a method of replacing a battery assembly by attaching and detaching the same to and from a vehicle body is being actively explored or developed.

The information disclosed in this Background of the Disclosure section is only to enhance understanding of the general background of the disclosure. Therefore, the Background of the Disclosure section should not be taken as an acknowledgement or any form of suggestion that the information therein forms the related art already known to a person of ordinary skill in the art.

SUMMARY OF THE DISCLOSURE

Therefore, the present disclosure has been made in view of the above problems. It is an object of the present disclosure to provide a battery assembly mounting structure having the following effects.

First, a fastening bolt, configured to mount a battery assembly in the lower side of a vehicle body, maintains an assembled state to the battery assembly even in the state in which the battery assembly is separated from the vehicle body. Accordingly, when the battery assembly is repeatedly attached to and detached from the vehicle body, it is not necessary to prepare the fastening bolt separately from the battery assembly, and the fastening bolt may be reused.

Secondly, when the battery assembly is mounted in the vehicle body, it is possible to prevent erroneous fastening by appropriately guiding a fastening angle of the fastening bolt while easily absorbing an assembly tolerance. Accordingly, it is possible not only to reliably obtain a battery assembly that may be easily assembled to and disassembled from the vehicle body, but also to easily replace the fastening bolt when the same is damaged.

In accordance with the present disclosure, the above and other objects can be accomplished by the provision of a vehicle battery assembly mounting structure. The mounting structure includes: a mounting bushing provided in a battery assembly to form a space, the space allowing movement in a vertical direction; a fastening bolt disposed to vertically penetrate the space formed by the mounting bushing; and a sleeve assembly configured to guide the fastening bolt, to elastically prevent the fastening bolt from being separated from the mounting bushing, and to elastically support the fastening bolt with respect to the mounting bushing to allow the fastening bolt to move in the mounting bushing.

The sleeve assembly may include a fixing guide fixed to the mounting bushing, a sleeve configured to surround and guide the fastening bolt in the fixing guide, and a guide spring configured to elastically support a space between the fixing guide and the sleeve.

The fixing guide may be elastically deformed to be detachably mounted in the mounting bushing.

The mounting bushing may have a cylindrical space formed therein. The mounting bushing may have a fixing groove formed on an inner circumferential surface thereof and configured to fix the fixing guide. The fixing guide may include a fixing protrusion elastically inserted into the fixing groove.

The sleeve may include a plurality of holding protrusions configured to elastically press and support an outer circumferential surface of the fastening bolt.

The sleeve may be formed in a cylindrical shape surrounding the fastening bolt. The plurality of holding protrusions may be provided in a plurality of elastic support parts protruding downwards from the sleeve.

The guide spring may include a plurality of leaf springs configured to connect the fixing guide to the sleeve. At least one side of each leaf spring may contact the sleeve and at least the other side may contact the fixing guide.

The guide spring may be formed of a plurality of leaf springs disposed between the fixing guide and the sleeve to form a spiral shape around the sleeve.

The mounting bushing may be installed to allow the fastening bolt to be disposed in a state of penetrating the case member provided in a battery assembly case of the battery assembly.

The mounting bushing may be formed in a cylindrical member welded in a state of being inserted into a hole formed in the case member.

BRIEF DESCRIPTION OF THE DRAWINGS

The above and other objects, features, and advantages of the present disclosure should be more clearly understood from the following detailed description taken in conjunction with the accompanying drawings, in which.

DETAILED DESCRIPTION OF EMBODIMENTS

Figure 1:
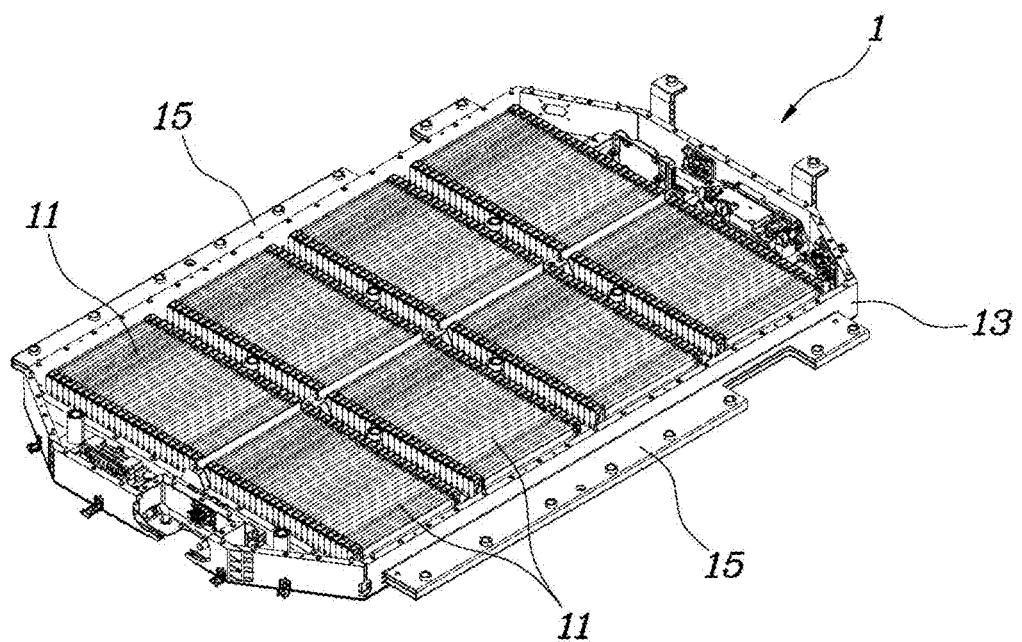
FIG. 1 is a view showing a battery assembly to which the present disclosure is applicable.
Figure 2:
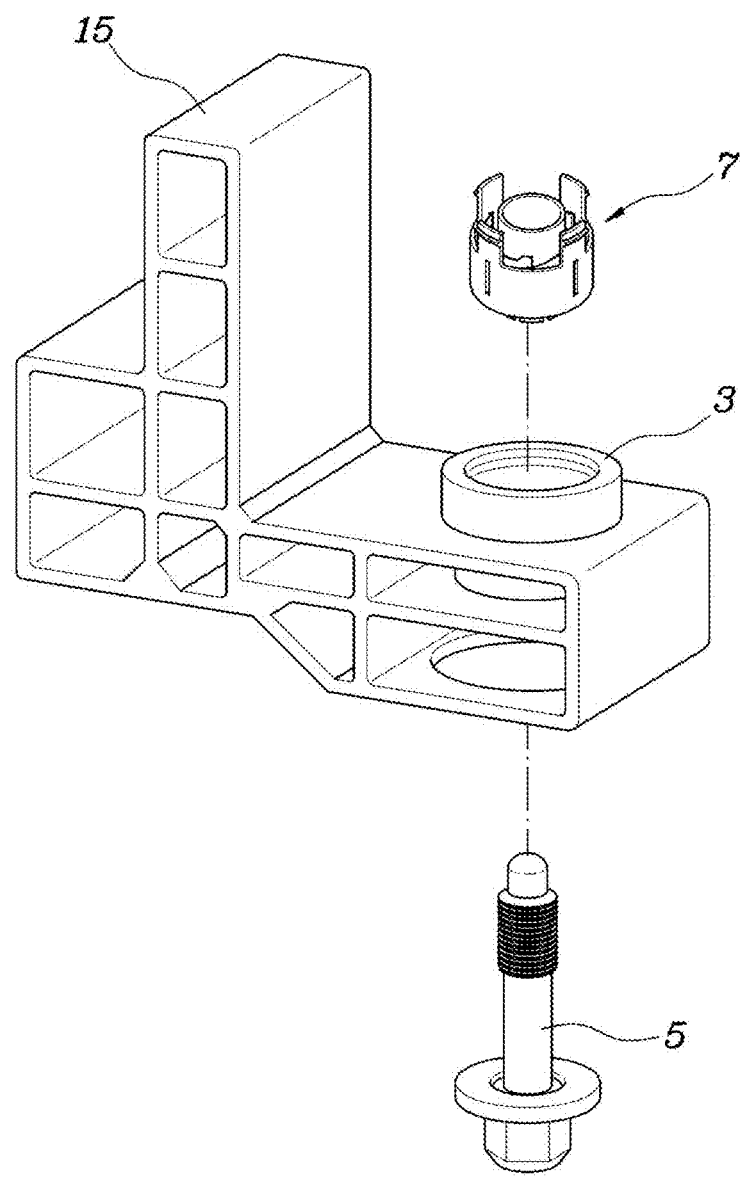
FIG. 2 is a view showing a main part of a vehicle battery assembly mounting structure according to the present disclosure.
Figure 3:
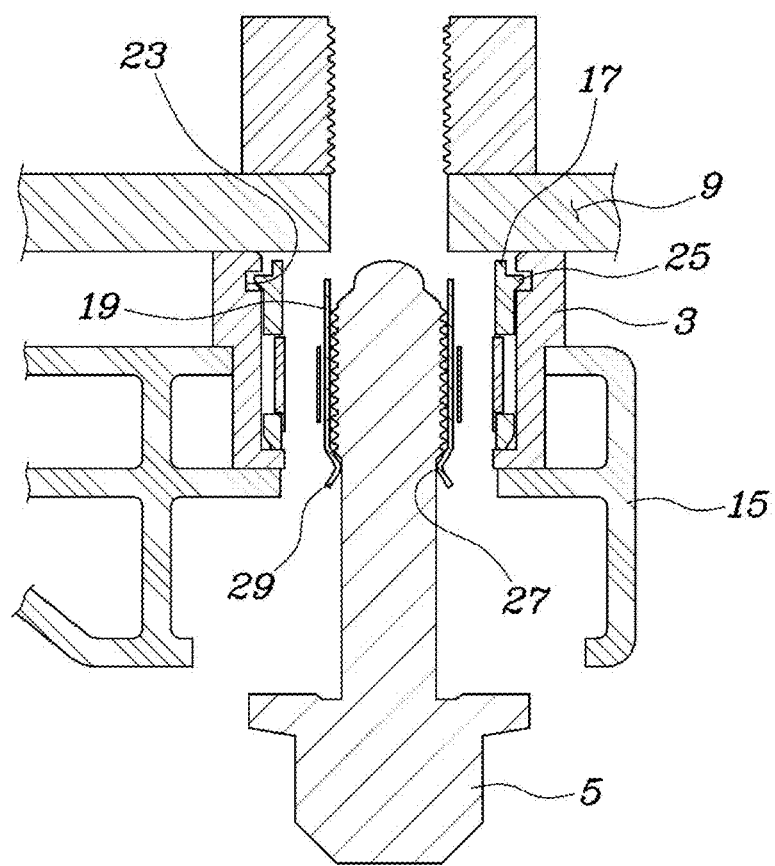
FIG. 3 is a longitudinal cross-sectional view of an assembled state of respective components shown in FIG. 2.

Specific structural or functional descriptions made in connection with the embodiments of the present inventive concept disclosed in this specification or application are merely illustrative for the purpose of describing embodiments according to the present inventive concept. Further, the present inventive concept may be implemented in various forms and should not be construed as being limited to the embodiments described in this specification or application.

Since the embodiments according to the present disclosure may be variously modified and may have various forms, specific embodiments are illustrated in the drawings and described in detail in this specification or application. However, it should be understood that the embodiments according to the inventive concept of the present disclosure are not intended to be limited to the specific disclosed forms. The embodiments include all modifications, equivalents, and substitutes that fall within the spirit and technical scope of the present inventive concept.

Meanwhile, in the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the inventive concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that no other components are present therebetween. Other expressions for the description of relationships between components, such as "between" and "directly between" or "adjacent to" and "directly adjacent to", should be interpreted in the same manner.

The terms used in the specification are only used to describe specific embodiments and are not intended to limit the present disclosure. In this specification, an expression in a singular form also includes the plural sense, unless otherwise clearly specified in context. It should be understood that expressions such as "comprise", "include", and "have" in this specification are intended to designate the presence of indicated features, numbers, steps, operations, components, parts, or combinations thereof, but do not exclude the presence or addition of one or more features, numbers, steps, operations, components, parts, or combinations thereof.

Unless otherwise defined, all terms used herein, including technical and scientific terms, have the same meanings as those commonly understood by those of ordinary skill in the art to which the present disclosure pertains. Terms such as those defined in commonly used dictionaries should be interpreted as having meanings consistent with their meanings in the context of the related technology. Further, unless explicitly defined in this specification, the terms should not be interpreted in an ideal or overly formal sense. When a component, device, element, or the like of the present disclosure is described as having a purpose or performing an operation, function, or the like, the component, device, or element should be considered herein as being "configured to" meet that purpose or perform that operation or function.

Hereinafter, the present inventive concept is described in detail by describing embodiments thereof with reference to the accompanying drawings. The same reference numerals in each drawing represent the same members.

Referring to FIGS. 2-7, a vehicle battery assembly mounting structure according to an embodiment of the present disclosure is disclosed. The mounting structure is formed of or includes a mounting bushing 3 provided in a battery assembly 1 to form a space, the space allowing movement in a vertical direction, a fastening bolt 5 disposed to vertically penetrate the space formed by the mounting bushing 3, and a sleeve assembly 7 configured to guide the fastening bolt 5. The sleeve assembly 7 may also be configured to elastically prevent the fastening bolt 5 from being separated from the mounting bushing 3. The sleeve assembly 7 may be further configured to elastically support the fastening bolt 5 with respect to the mounting bushing 3 to allow the fastening bolt 5 to move in the mounting bushing 3.

In other words, in the present disclosure, since the sleeve assembly 7 elastically supports the fastening bolt 5, the fastening bolt 5 maintains an assembled or connected state to a battery assembly 1 even in the state in which the fastening bolt 5 is not coupled to a vehicle body 9. Accordingly, when the fastening bolt 5 is being coupled to the vehicle body 9, it is possible to prevent erroneous fastening by appropriately guiding a fastening angle of the fastening bolt 5 while easily absorbing an assembly tolerance.

Further, the fastening bolt 5 may be repeatedly used when the battery assembly 1 is repeatedly attached to and detached from the vehicle body 9. Additionally, since the fastening bolt 5 is not completely separated from the battery assembly 1, it is not necessary to individually handle a plurality of fastening bolts 5, thereby reliably obtaining a battery assembly that may be easily assembled to and disassembled from the vehicle body.

In addition, in the case in which the fastening bolt 5 is required to be replaced due to damage to a screw thread of the fastening bolt 5, since the sleeve assembly 7 elastically and/or removably supports the fastening bolt 5, the fastening bolt 5 may be easily replaced.

FIG. 1 shows the battery assembly 1 to which the present disclosure is applicable. As shown in FIG. 1, a plurality of battery assembly modules 11 are accommodated in a battery assembly case 13, and the battery assembly case 13 includes a case member 15.

In some embodiments, the mounting bushing 3 is installed to allow the fastening bolt 5 to be disposed in a state of penetrating the case member 15.

In other words, the mounting bushing 3 is formed in a cylindrical member welded in a state of being inserted into a hole formed in the case member 15. The fastening bolt 5 penetrates the case member 15 through the mounting bushing 3 to be coupled to the vehicle body 9.

The sleeve assembly 7 is formed of a fixing guide 17 fixed to the mounting bushing 3, a sleeve 19 configured to surround and guide the fastening bolt 5 in the fixing guide 17, and a guide spring 21 configured to elastically support a space between the fixing guide 17 and the sleeve 19.

In other words, the sleeve assembly 7 fixes the fixing guide 17 to the mounting bushing 3. Next, when the fastening bolt 5 is inserted into the sleeve 19, the guide spring 21 elastically supports the sleeve 19 with respect to the fixing guide 17. As such, the fastening bolt 5 is elastically supported by the mounting bushing 3.

The fixing guide 17 is elastically deformed to be detachably mounted in the mounting bushing 3.

The mounting bushing 3 has a cylindrical space formed therein. The mounting bushing 3 has a fixing groove 23 formed on the inner circumferential surface thereof and configured to fix the fixing guide 17. Further, the fixing guide 17 includes a fixing protrusion 25 elastically inserted into the fixing groove 23.

Therefore, when the sleeve assembly 7 is damaged, the sleeve assembly 7 may be removed from the mounting bushing 3 by elastically deforming the fixing protrusion 25. In this manner, the sleeve assembly 7 may be easily replaced.

The sleeve 19 includes a plurality of holding protrusions 27 configured to elastically press and support the outer circumferential surface of the fastening bolt 5.

In other words, even in the state in which the fastening bolt 5 is not coupled to the vehicle body 9, the fastening bolt 5 may maintain the assembled or coupled state to the battery assembly 1 by the holding protrusion 27.

In some embodiments, the sleeve 19 is formed in a cylindrical shape surrounding the fastening bolt 5 so as to easily guide the fastening bolt 5. The plurality of holding protrusions 27 is provided in a plurality of elastic support parts 29 protruding downwards from the sleeve 19.

In other words, the plurality of elastic support part 29 is integrally formed in the lower side of the cylindrical sleeve 19. The plurality of elastic support part 29 is bent as shown in the drawings to form the plurality of holding protrusions 27. Accordingly, the plurality of elastic support parts 29 and the plurality of holding protrusions 27 are configured to be integrally formed with the sleeve 19.

Figure 4:
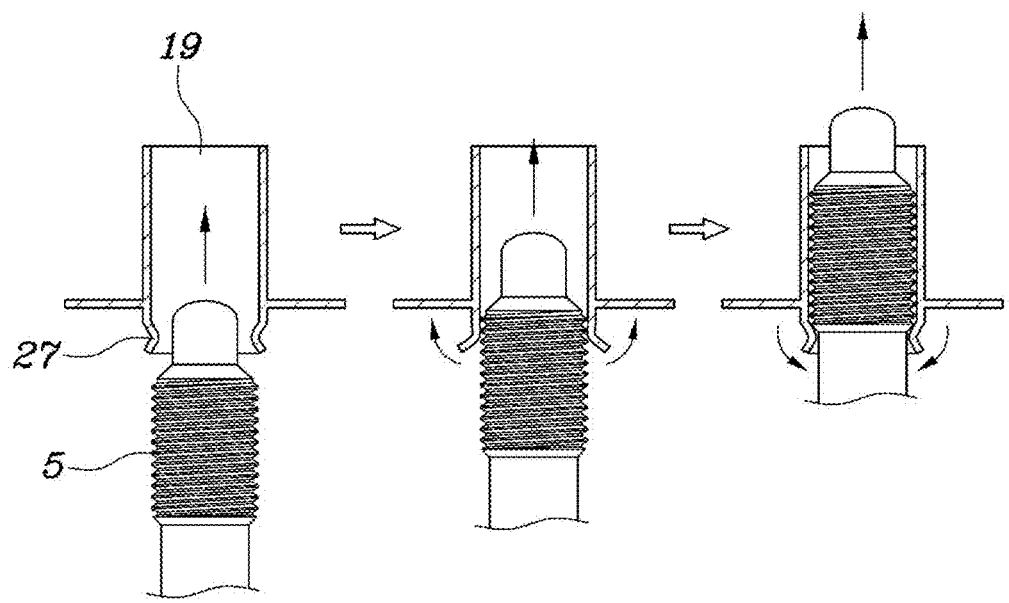
FIG. 4 is a view showing a process in which a fastening bolt is coupled to a sleeve.
Figure 5:
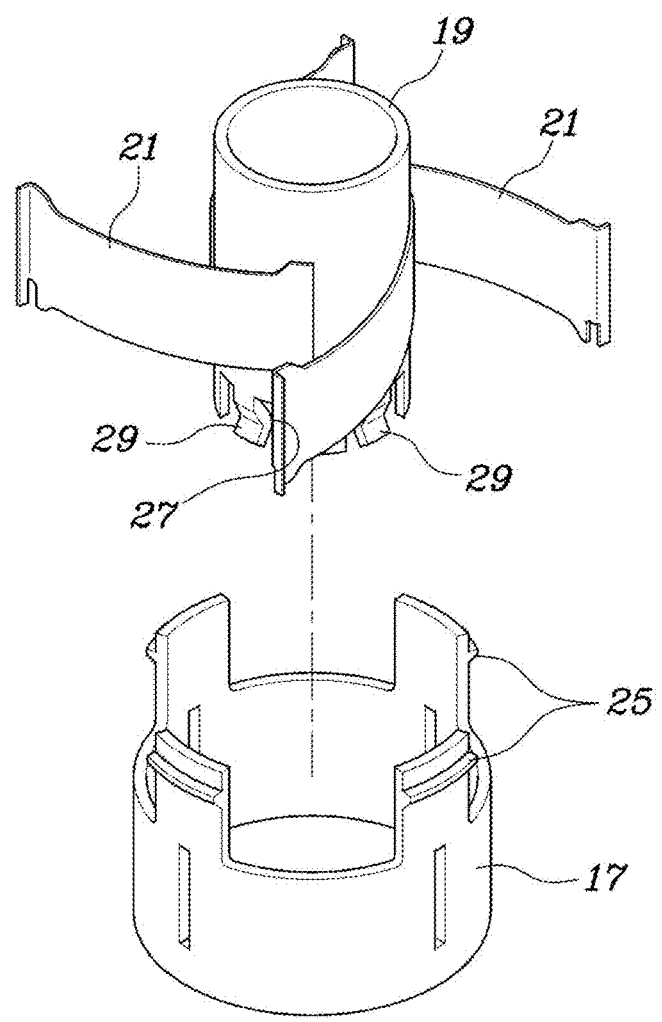
FIG. 5 is an exploded perspective view of a sleeve assembly.
Figure 6:
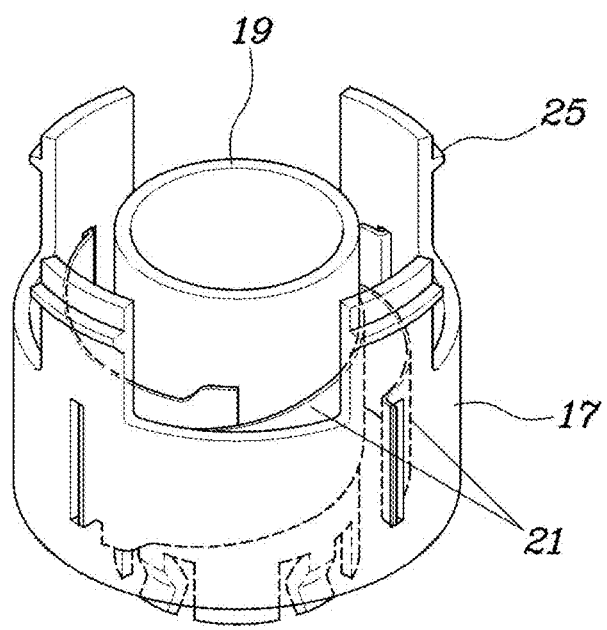
FIG. 6 is a view showing a coupling state of the sleeve assembly.

FIG. 4 shows a process of mounting the fastening bolt 5 in the sleeve 19. When the fastening bolt 5 is pressed from the lower side of the sleeve 19, the elastic support part 29 is elastically deformed outwards and the fastening bolt 5 is inserted into the sleeve 19. Next, the elastic support part 29 elastically supports the outer circumferential surface of the fastening bolt 5 with the holding protrusion 27, thereby preventing the fastening bolt 5 from being separated from the sleeve 19.

Particularly, in the last state of FIG. 4, the fastening bolt 5 is supported by the holding protrusion 27 in the state in which all the threaded portions of the fastening bolt 5 have passed through the holding protrusion 27 upwards. In other words, the fastening bolt 5 is supported when the entire threaded portion of the fastening bolt 5 is located above the holding protrusion 27. Accordingly, even when the fastening bolt 5 is not coupled to the vehicle body 9, this state, in which the entire threaded portion of the fastening bolt 5 has passed through the holding protrusion 27, is stably maintained. Further, when the fastening bolt 5 is coupled to the vehicle body 9, the threaded portion of the fastening bolt 5 is easily coupled to the vehicle body 9 while being guided by the sleeve 19, as it is, and without passing through the holding protrusion 27 again.

Accordingly, it is desirable that an inner diameter portion of the sleeve 19 be formed to have a size configured to allow the threaded portion of the fastening bolt 5 to be guided in a straight line. Thereby, a fastening angle of the fastening bolt 5 is appropriately guided when the fastening bolt 5 is coupled to the vehicle body 9.

In some embodiments, the guide spring 21 includes a plurality of leaf springs configured to connect the fixing guide 17 to the sleeve 19. For each leaf spring, one side (e.g., a first side) of the leaf spring contacts the sleeve 19 and the other side (e.g., a second side) contacts the fixing guide 17.

Here, the surface of the leaf spring may be understood as the widest surface of the leaf spring. This surface is disposed to form a plane perpendicular to a plane perpendicular to the longitudinal direction of the sleeve 19. In other words, the surface of the leaf spring may form a plane perpendicular to the cross-sectional plane illustrated in FIG. 7. Accordingly, when the sleeve 19 moves relative to the fixing guide 17, the guide spring 21 is deformed on the plane (as shown in FIG. 7) perpendicular to the longitudinal direction of the sleeve 19 as much as possible.

Figure 7:
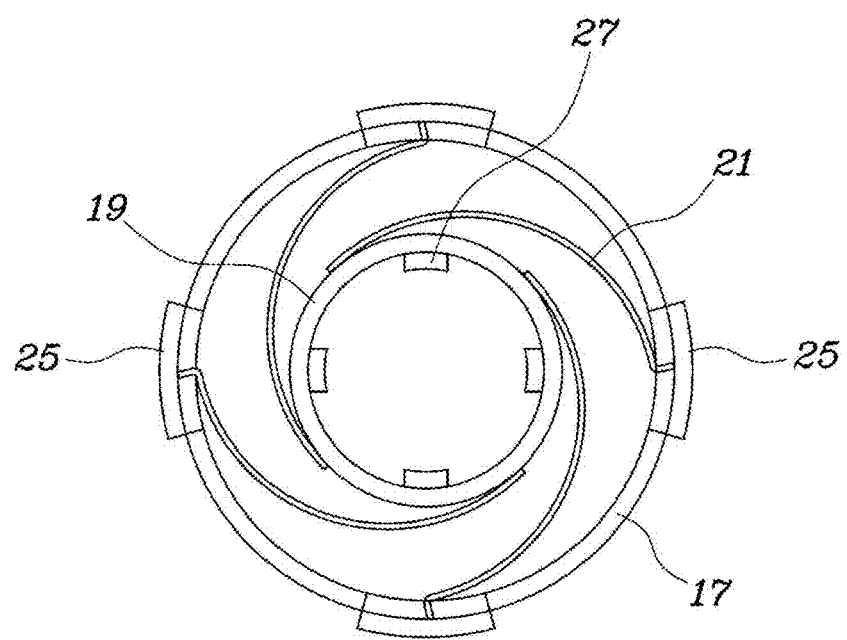
FIG. 7 is a view of the sleeve assembly in FIG. 6, viewed from above.

In other words, the guide spring 21 is formed of a plurality of leaf springs disposed between the fixing guide 17 and the sleeve 19 to form a spiral shape around the sleeve 19, as shown in FIG. 7. Thereby, it is possible to immediately restore an original position of the sleeve 19 and an original posture thereof even though the sleeve 19 moves in the fixing guide 17 or the posture thereof is changed therein.

Accordingly, the fastening angle of the fastening bolt 5 guided by the sleeve 19 may be stably maintained in a correct state.

The guide spring may not be formed of the plurality of leaf springs as described above but may be formed of a plurality of coil springs disposed between the fixing guide and the sleeve.

As is apparent from the above description, the present disclosure has the following effects.

First, a fastening bolt, configured to mount a battery assembly in the lower side of a vehicle body, maintains an assembled or coupled state to the battery assembly even in the state in which the battery assembly is separated from the vehicle body. Accordingly, when the battery assembly is repeatedly attached to and detached from the vehicle body, it is not necessary to prepare the fastening bolt separately from the battery assembly, and the fastening bolt may be reused.

Secondly, when the battery assembly is mounted in the vehicle body, it is possible to prevent erroneous fastening by appropriately guiding a fastening angle of the fastening bolt while easily absorbing an assembly tolerance. Accordingly, it is possible not only to reliably obtain a battery assembly that may be easily assembled to and disassembled from the vehicle body, but also to easily replace the fastening bolt when the same is damaged. A plurality of the fastening bolts may be used to mount the battery assembly in the vehicle body.

Although the embodiments of the present inventive concept have been disclosed for illustrative purposes, those of ordinary skill in the art should appreciate that various modifications, additions, and substitutions are possible, without departing from the scope and spirit of the inventive concept as disclosed in the accompanying claims.

What is claimed is:

1. A vehicle battery assembly mounting structure comprising:
   a mounting bushing provided in a battery assembly to form a space, the space allowing movement in a vertical direction;
   a fastening bolt disposed to vertically penetrate the space formed by the mounting bushing; and
   a sleeve assembly configured to guide the fastening bolt, to elastically prevent the fastening bolt from being separated from the mounting bushing, and to elastically support the fastening bolt with respect to the mounting bushing to allow the fastening bolt to move in the mounting bushing,
   wherein the sleeve assembly comprises:
      a fixing guide fixed to the mounting bushing,
      a sleeve configured to surround and guide an outer circumferential surface of the fastening bolt in the fixing guide, and a guide spring configured to elastically support a space between the fixing guide and the sleeve in a radial direction of the fastening bolt.

2. The vehicle battery assembly mounting structure according to claim 1, wherein the fixing guide is elastically deformed to be detachably mounted in the mounting bushing.

3. The vehicle battery assembly mounting structure according to claim 2, wherein the mounting bushing has the space therein in a cylindrical shape, the mounting bushing has a fixing groove formed on an inner circumferential surface thereof and configured to fix the fixing guide, and the fixing guide comprises a fixing protrusion elastically inserted into the fixing groove.

4. The vehicle battery assembly mounting structure according to claim 1, wherein the sleeve comprises a plurality of holding protrusions configured to elastically press and support the outer circumferential surface of the fastening bolt.

5. The vehicle battery assembly mounting structure according to claim 2, wherein the sleeve is formed in a cylindrical shape surrounding the fastening bolt, and the plurality of holding protrusions is provided in a plurality of elastic support parts protruding downwards from the sleeve.

6. The vehicle battery assembly mounting structure according to claim 1, wherein the guide spring comprises a plurality of leaf springs configured to connect the fixing guide to the sleeve, and at least one side of each leaf spring contacts the sleeve and at least the other side contacts the fixing guide.

7. The vehicle battery assembly mounting structure according to claim 6, wherein the guide spring is formed of a plurality of leaf springs disposed between the fixing guide and the sleeve to form a spiral shape around the sleeve.

8. The vehicle battery assembly mounting structure according to claim 1, wherein the mounting bushing is installed to allow the fastening bolt to be disposed in a state of penetrating a case member provided in a battery assembly case of the battery assembly.

9. The vehicle battery assembly mounting structure according to claim 8, wherein the mounting bushing is formed in a cylindrical member welded in a state of being inserted into a hole formed in the case member.

\* \* \* \* \*